(12) United States Patent
Herbek et al.

(10) Patent No.: US 8,267,033 B2
(45) Date of Patent: Sep. 18, 2012

(54) CLATHRATE GLIDER WITH HEAT EXCHANGER

(75) Inventors: Matthew Herbek, Gainesville, VA (US);
Matthew B. Ascari, Manassas, VA (US);
John W. Rapp, Manassas, VA (US);
Robert J. Howard, Clifton, VA (US)

(73) Assignee: Lockheed Martin Corporation,
Bethesda, MD (US)

( * ) Notice: Subject to any disclaimer, the term of this patent is extended or adjusted under 35 U.S.C. 154(b) by 377 days.

(21) Appl. No.: 12/557,143

(22) Filed: Sep. 10, 2009

(65) Prior Publication Data

US 2011/0226176 A1    Sep. 22, 2011

Related U.S. Application Data

(63) Continuation-in-part of application No. 12/017,966, filed on Jan. 22, 2008.

(51) Int. Cl.
*B63G 8/22* (2006.01)
(52) U.S. Cl. ......................................................... 114/333
(58) Field of Classification Search .......... 114/312–342, 114/125; 165/104.17
See application file for complete search history.

(56) References Cited

U.S. PATENT DOCUMENTS

| | | |
|---|---|---|
| 4,393,926 A | 7/1983 | Appel |
| 4,696,338 A * | 9/1987 | Jensen et al. ............. 165/104.17 |
| 4,718,242 A | 1/1988 | Yamauchi et al. |
| 5,032,271 A | 7/1991 | Urry |
| 5,085,055 A | 2/1992 | Urry |
| 5,255,518 A | 10/1993 | Urry |
| 5,291,847 A * | 3/1994 | Webb ............................ 114/331 |
| 5,497,630 A | 3/1996 | Stein et al. |
| 5,778,685 A | 7/1998 | Singh et al. |
| 7,337,612 B2 | 3/2008 | Skinnes et al. |
| 2005/0178125 A1 | 8/2005 | Skinnes et al. |
| 2007/0034194 A1 | 2/2007 | Defilippi et al. |
| 2008/0141665 A1 | 6/2008 | Yusa |

FOREIGN PATENT DOCUMENTS

| | | |
|---|---|---|
| GB | 2039020 A | 7/1980 |
| RU | 2184252 C2 | 6/2002 |

OTHER PUBLICATIONS

"Clathrate-Based Fuel Storage and Transport Media: Potential Impact", pp. 463-466, http://www.anl.gov/PCS/acsfuel/preprint%20archive/Files/42_2_SAN%20FRANCISCO_04--97_0463.pdf, Apr. 1997.
Methane Hydrate, 3 pages, http:www.experiencefestival.com/methane_clathrate, Accessed on Feb. 25, 2009.

* cited by examiner

*Primary Examiner* — Edwin Swinehart
(74) *Attorney, Agent, or Firm* — Howard IP Law Group, P.C.

(57) ABSTRACT

An apparatus includes a housing and a ballast disposed within the housing. The ballast is adapted to receive, store and expel a fluid. A bladder is operatively coupled to the ballast wherein an increase in the volume of the bladder causes a decrease in the free volume of the ballast available for the storage of the fluid therewithin and a decrease in the volume of the bladder causes an increase in the free volume of the ballast available for the storage of the fluid therewithin. A heat exchanger has a heat exchange duct thermally coupled to the bladder and is adapted to receive a fluid from outside the housing. The bladder is configured to receive a clathrate.

21 Claims, 7 Drawing Sheets

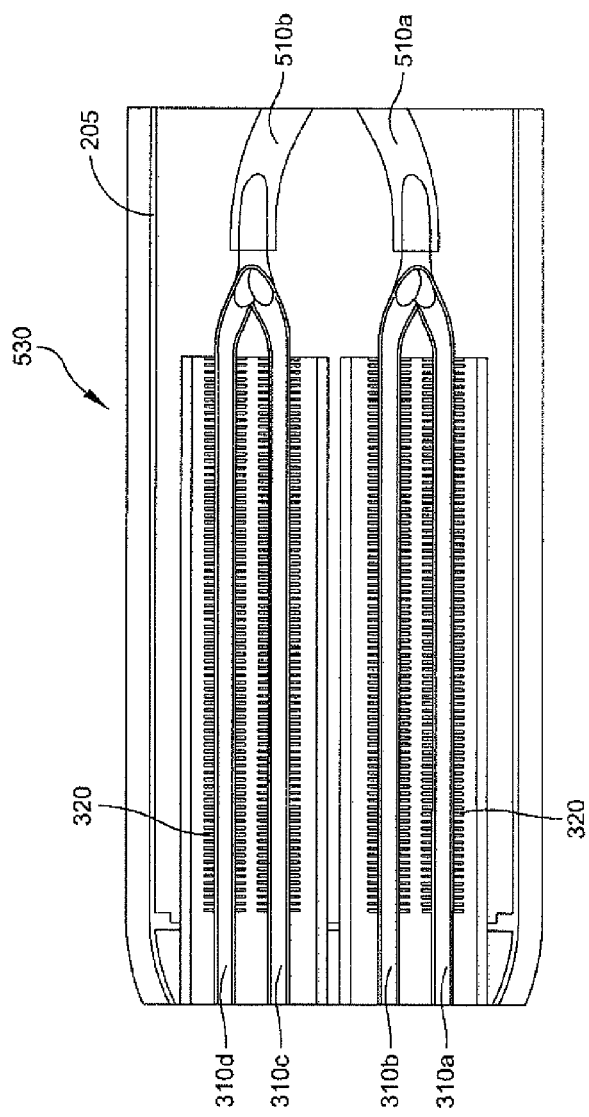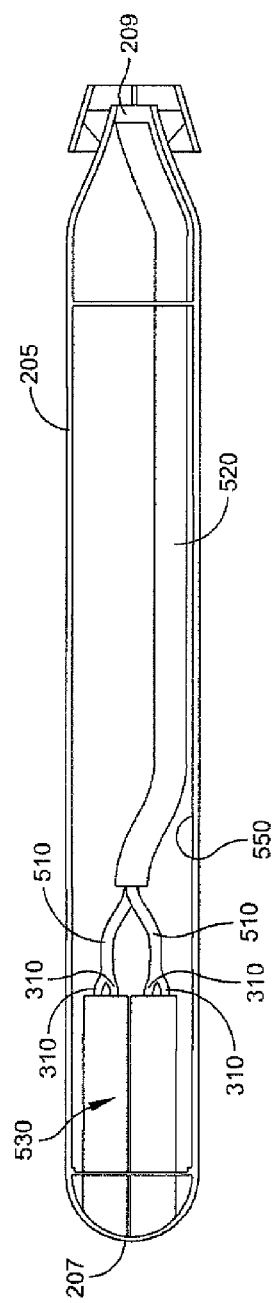

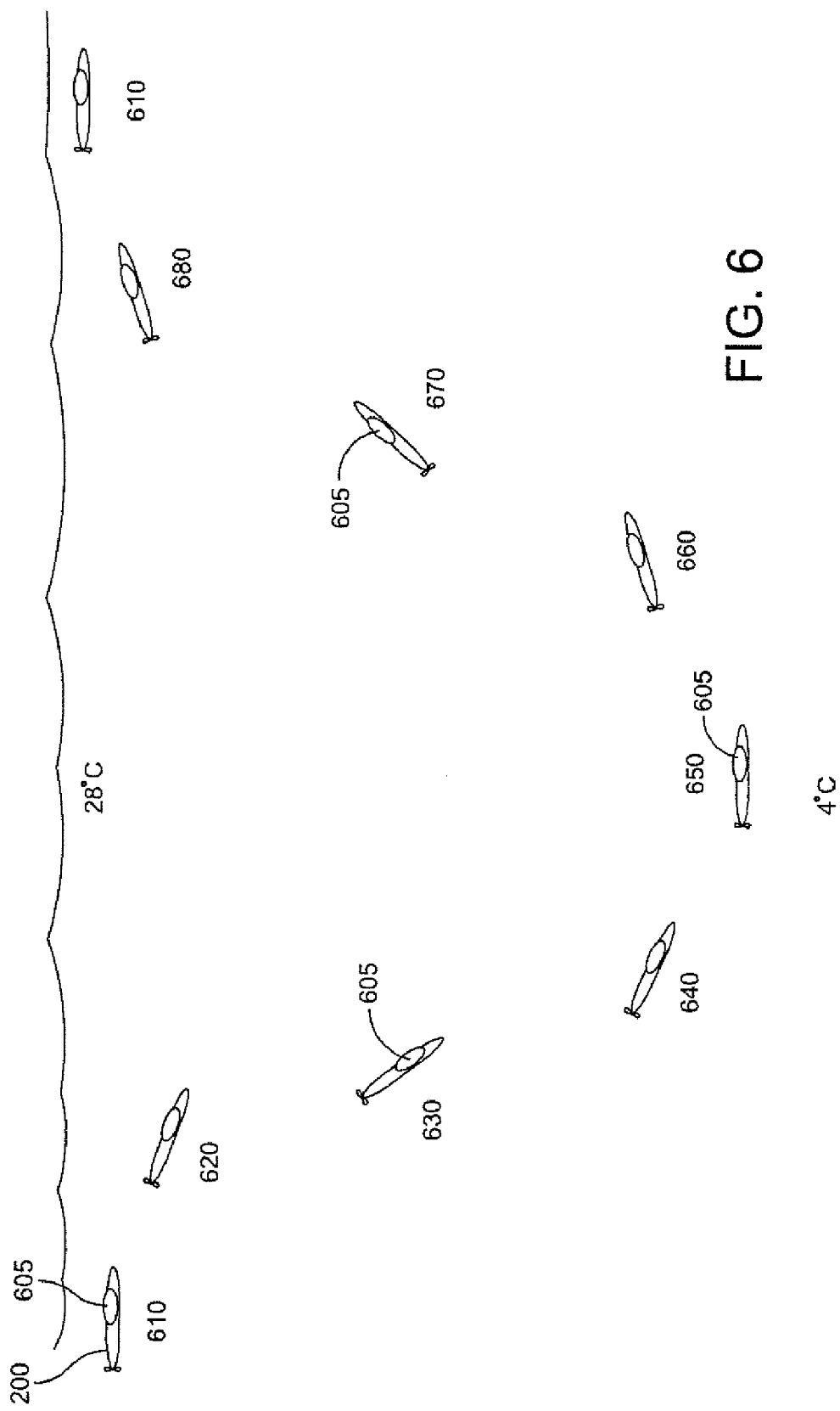

CLATHRATE GLIDER WITH HEAT EXCHANGER

CROSS-REFERENCE TO RELATED APPLICATION

This application is a continuation-in-part of co-pending commonly assigned U.S. patent application Ser. No. 12/017,966, entitled Ocean Thermal Buoyancy and Propulsion System, filed Jan. 22, 2008, and incorporated herein by reference in its entirety.

FIELD OF INVENTION

The present invention relates in general to unmanned underwater vehicles, and in particular to the buoyancy and propulsion of unmanned underwater vehicles.

BACKGROUND

Unmanned underwater vehicles (UUV) are utilized for a variety of applications including both commercial and military operations. However, providing such vehicles with sufficient fuel and/or power storage means necessary to propel the UUV and its payload for extended periods of time have been problematic. Improved power and propulsion systems for UUVs would prove beneficial.

SUMMARY OF THE INVENTION

According to an embodiment of the invention, an apparatus includes a housing and a ballast disposed within the housing. The ballast is adapted to receive, store therewithin and expel a fluid. A bladder is cooperatively coupled with the ballast and is adapted to receive a clathrate. The bladder is cooperatively coupled to the ballast such that an increase in the volume of the bladder decreases the free volume of the ballast available to store the fluid therewithin and a decrease in the volume of the bladder increases the free volume of the ballast available to store the fluid therewithin. The housing further includes a heat exchanger having a heat exchange duct thermally coupled to the bladder. The heat exchange duct is adapted to receive the fluid from outside the housing.

In an embodiment of the invention, the housing further includes a flexible membrane separating the ballast from the bladder, such that an increase in the volume of the bladder decreases the free volume of the ballast available for the storage of the fluid therewithin and a decrease in the volume of the bladder increases the free volume of the ballast available for the storage of the fluid therewithin.

According to another embodiment of the invention, the housing further includes a piston operatively coupled to the bladder and is adapted to control the volume of the ballast such that an increase in the volume of the bladder decreases the free volume of the ballast available for the storage of the fluid therewithin and a decrease in the volume of the bladder increases the free volume of the ballast available for the storage of the fluid therewithin.

According to an embodiment of the invention, the heat exchanger duct may further include a plurality of fins disposed thereon. According to another embodiment of the invention, the plurality of fins may extend radially from the heat exchanger duct.

According to an embodiment of the invention, a method for altering the buoyancy of an underwater vehicle includes the steps of submerging the underwater vehicle into a body of water. The underwater vehicle includes a housing, and a ballast disposed in the housing. The ballast is adapted to receive from, store therewithin and expel the water to the body of water. The housing further includes a bladder containing a clathrate and disposed in a cooperative coupling with the ballast such that an increase in the volume of the bladder causes a decrease in the free volume of the ballast available for the storage of the water therewithin and a decrease in the volume of the bladder causes in increase in the free volume of the ballast available for the storage of water therewithin. A heat exchanger duct passes through the bladder. In a first operational stage, the water is allowed to flow through the duct, wherein the temperature of the water is higher than the freezing temperature of the clathrate The water is allowed to flow to and be stored in the ballast, thereby decreasing the buoyancy of the underwater vehicle. In a second operational stage, the water is allowed to flow through the duct, wherein the temperature of the water is lower than the freezing temperature of the clathrate. The water is caused to flow out of the ballast, thereby increasing the buoyancy of the underwater vehicle.

According to an embodiment of the invention, a heat exchanger for an underwater vehicle includes a first heat exchanger duct having an inlet and an outlet. The heat exchanger duct is disposed in a bladder. The bladder contains a clathrate. The first heat exchanger is at least partially surrounded by the clathrate and is adapted to receive a fluid through the inlet. Heat is transferred between the clathrate and the fluid flowing through the duct depending on the temperatures of the fluid and the clathrate. The heat transfer between the clathrate and the fluid causes an increase or a decrease in the volume of the bladder.

BRIEF DESCRIPTION OF THE DRAWINGS

Understanding of the present invention will be facilitated by consideration of the following detailed description of the exemplary embodiments of the present invention taken in conjunction with the accompanying drawings, in which like numerals refer to like parts and in which:

FIG. 5A illustrates a heat exchanger arrangement disposed along proximal end of the seawater intake ducts of an unmanned underwater vehicle, according to an embodiment of the invention;

FIG. 5B illustrates a more detailed view of the heat exchanger arrangement disposed along the proximal end of the seawater intake ducts of FIG. 5A, according to an embodiment of the invention;

FIG. 6 illustrates schematically operational stages of the unmanned underwater vehicle of FIG. 2, according to an embodiment of the invention.

DETAILED DESCRIPTION

Figure 1:
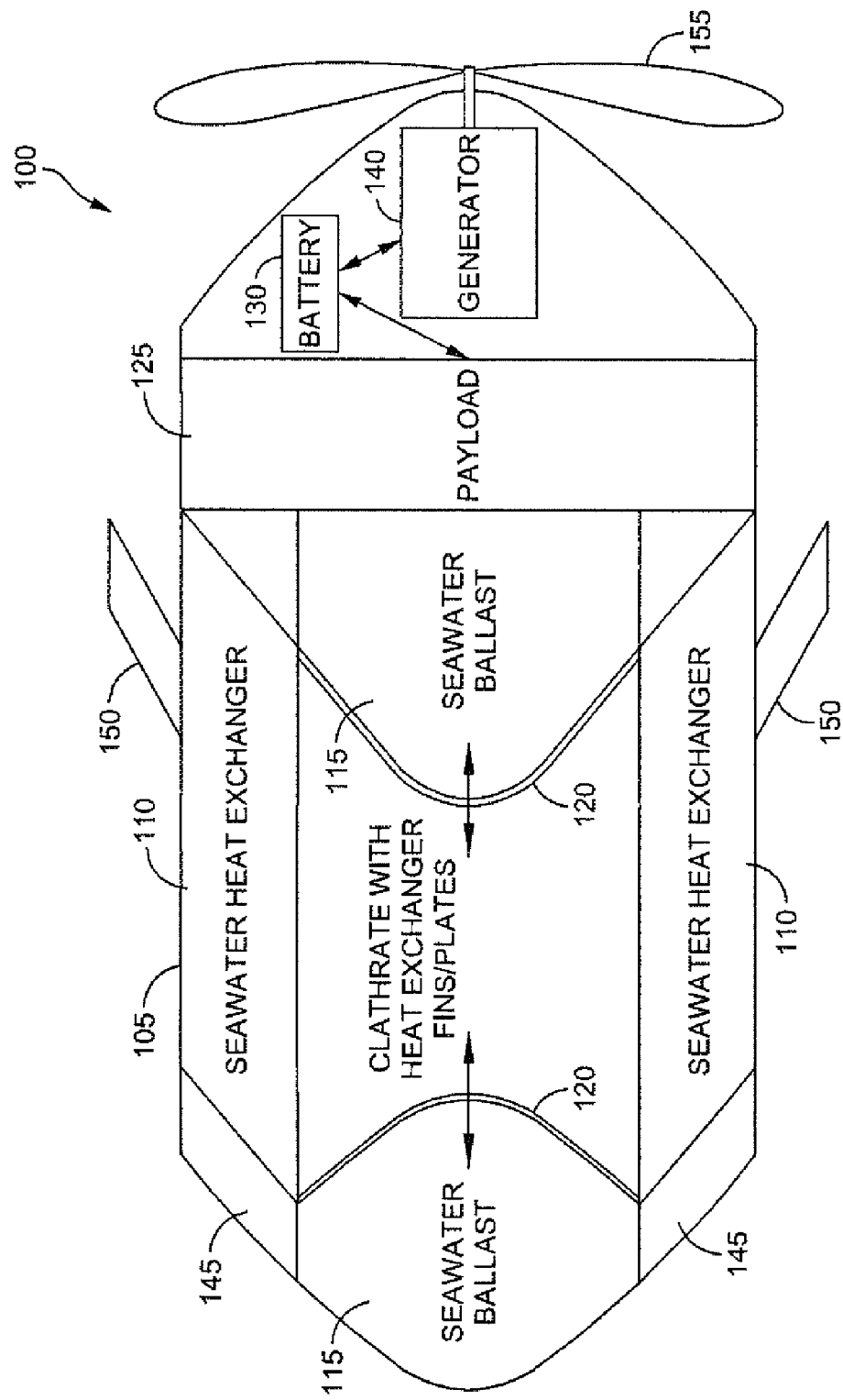
FIG. 1 is a schematic diagram of a buoyancy and propulsion system for an unmanned underwater vehicle, according to embodiment of the invention.

It is to be understood that the figures and descriptions of the present invention have been simplified to illustrate elements that are relevant for a clear understanding of the present invention, while eliminating, for purposes of clarity, many other elements found in typical unmanned underwater vehicles and their buoyancy and propulsion systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

One or more figures show block diagrams of systems and apparatus of embodiments of the invention. One or more figures show flow diagrams illustrating systems and apparatus for such embodiments. The operations of the flow diagrams will be described with references to the systems/apparatus shown in the block diagrams. However, it will be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In an embodiment, the thermoclines of an ocean, sea, or other large body of water are used as energy sources to provide motion and to power the payload of a UVV. Specifically, clathrates (for example, methane hydrate, hydrates of R-114, and propane hydrate) may be used to alter the buoyancy of the UUV by exchanging heat with the ocean environment and provide propulsion energy to the UUV. The propulsion of the UUV may further provide energy to power the payload.

In general, a clathrate (or clathrate compound or cage compound) is a chemical substance which includes a lattice of one type of molecule trapping and containing a second type of molecule. For example, a clathrate hydrate is a special type of gas hydrate that consists of water molecules enclosing a trapped gas. A clathrate is, therefore, a material which is a weak composite, with molecules of suitable size captured in spaces which are left by other compounds. Methane clathrate (methane hydrate or methane ice) is a solid form of water that contains a predetermined amount of methane within its crystal structure. In the following description, the term clathrate solution refers to liquid clathrate, which includes hydrocarbon molecules dissolved in water or other solvent. The term clathrate ice refers to a solid clathrate hydrate. The term clathrate slurry refers to a mixture of clathrate ice and clathrate solution. The term clathrate may be used generically to refer to any of the clathrate solution, clathrate ice and clathrate slurry.

UUV embodiments function most efficiently in tropical oceans, seas, and other large bodies of water. The UUV makes use of the different temperatures between the depths of the seawater. For example, in tropical waters, the temperature of the seawater at the surface can be around 28° Celsius (C.), yet be as low as 4° C. at a depth of about 1000 meters. In an embodiment, a ballast tank on the UUV has an expandable bladder contained therewithin that is used to manipulate the buoyancy of the UUV. In another embodiment, the ballast tank of the UUV is cooperatively coupled to an expandable bladder. The bladder is filled with a clathrate, which freezes and expands, for example, at about 6° C., and forms clathrate ice and which liquefies and contracts when it is heated to a temperature above 6° C. and forms clathrate solution. Thus, a clathrate may be so selected that its freezing/melting temperature lies between the high surface temperature of a water body and the low temperature of water at operating depths in the water body. It is understood that the clathrates having a higher or a lower freezing temperature may also be used. A cycle of bladder expansion followed by bladder contraction is directly coupled to the diving and surfacing of the UUV through the ocean thermoclines.

For a given clathrate, at a given temperature, if the pressure decreases below a critical pressure, the clathrate may evaporate. If the clathrate becomes a gas, that would make it difficult for the UUV to re-submerge once it has surfaced due to the increased buoyancy of the clathrate gas. Therefore, in one configuration, a clathrate may be maintained at a pressure above the critical pressure, at a given temperature, to prevent the evaporation. In an exemplary embodiment, the clathrate may be maintained at a pressure of about 150 pounds per square inch (psi). The minimum pressure may be adjusted depending on the properties of clathrates.

Therefore, in an exemplary embodiment, a mechanism for maintaining the clathrate at a pressure above the critical pressure, at a given temperature, is included to prevent the clathrate from becoming a gas when it is heated by the surface water. In one configuration, such a mechanism may take the form of some sort of stop for a bladder membrane, such as a wall or barrier made of memory metal or other suitable temperature responsive material. Such a stop serves to limit the extent of expansion of the bladder membrane, thereby averting a drop in the clathrate pressure below the critical pressure. In another configuration, a spring mechanism may be used to maintain a predetermined pressure on the bladder containing the clathrate. In another embodiment, a piston system for holding the clathrate may be used instead of a bladder system, since such a piston system would have strict expansion limits defined by the volume of the piston's cylinder, thereby maintaining the clathrate at a pressure above the critical pressure. Whether the clathrate system is bladder-based or piston-based, the clathrate system is so adapted that a controlled expansion in the clathrate system displaces seawater in the ballast by decreasing the free volume in the ballast available for the storage of the seawater therein and a contraction in the clathrate system permits the reception and storage of seawater in the ballast by increasing the free volume in the ballast available for the storage of the seawater therein.

Referring to FIG. 1, an UUV 100 is schematically illustrated, according to an exemplary embodiment of the invention. UUV 100 includes a housing 105. Housing 105 includes a heat exchanger 110, a ballast 115, a bladder 120, a payload 125, a battery 130, a generator 140, inlets 145, control fins 150, and a turbine 155. In another embodiment, a piston system may be used instead of bladder 120. In one configuration, a flexible barrier may separate bladder 120 and ballast 115, wherein bladder 120 is disposed adjacent to ballast 115. In another configuration, bladder 120 may be contained within ballast 115. In either configuration, bladder 120 and ballast 115 are so cooperatively coupled that an increase in the volume of bladder 120 results in a decrease in the free volume of ballast 115 available for storage of a fluid, for example, seawater therewithin, and a decrease in the volume of bladder 120 results in an increase in the free volume of ballast 115 available for storage of the fluid therewithin.

Figure 2:
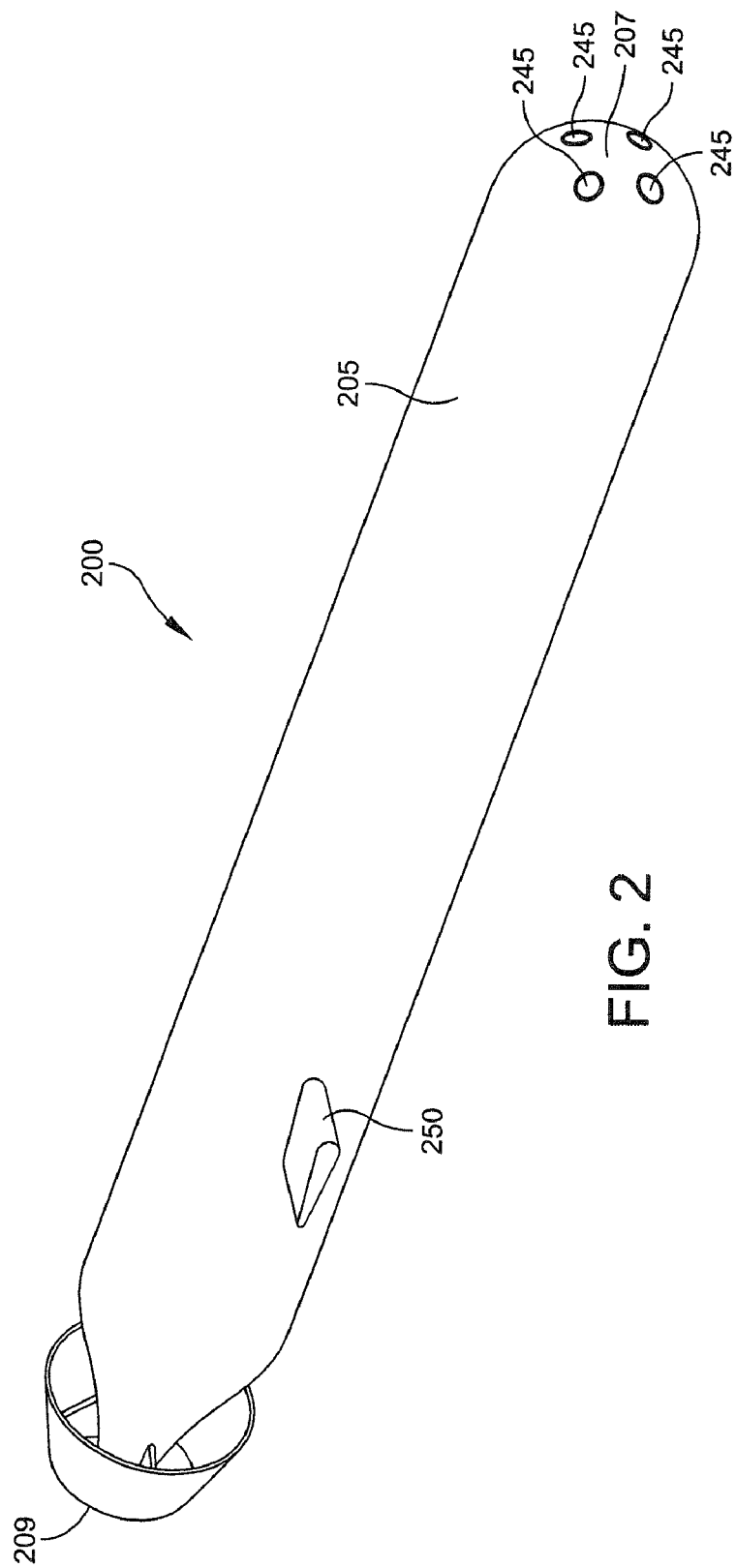
FIG. 2 is an unmanned underwater vehicle, according to an embodiment of the invention.

Referring now to FIG. 2, a UUV 200 is illustrated, according to an exemplary embodiment of the invention. UUV 200 includes a housing 205 and control fins 250 disposed on opposite sides of housing 205. In one configuration, housing 205 is generally elongated and cylindrical in shape. It will be understood that other shapes may also be used for housing 205. Housing 205 has an anterior end 207 and a posterior end 209. In the illustrated embodiment, housing 205 includes four inlets 245 at anterior end 207. It will be understood that, in other embodiments, housing 205 may have more than or fewer than four inlets 245. Inlets 245 may further include valves or other such flow control mechanisms to control the intake of the fluid in which UUV 200 is immersed. In one configuration, UUV 200 may further include a controller (not shown) which, among other things, may regulate the operations of control fins 250 and the valves or other such flow control mechanisms for inlets 245.

Figure 3A:
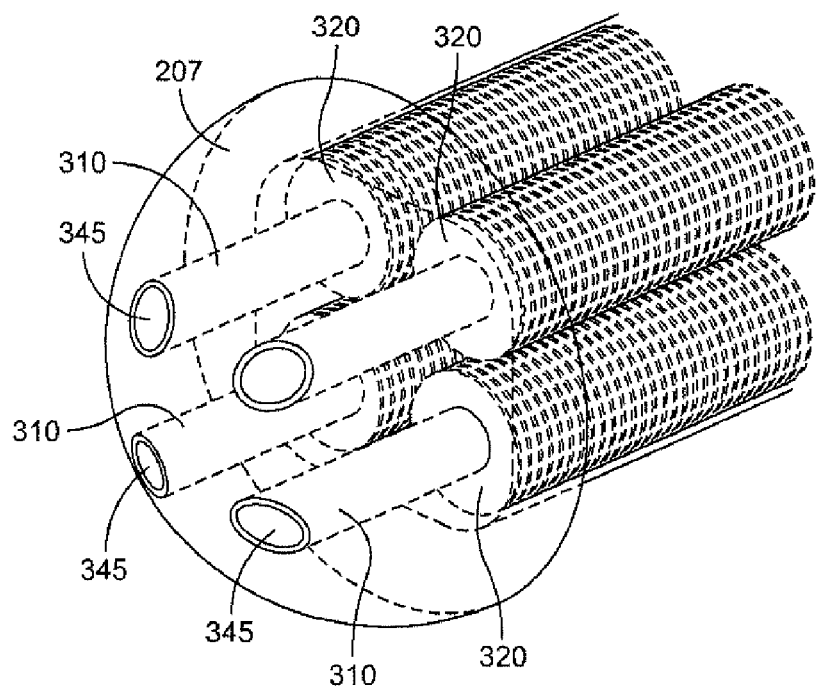
FIG. 3A is a perspective view of seawater intake ducts for the unmanned underwater vehicle of FIG. 2, according to an embodiment of the invention.

Referring now to FIG. 3A in conjunction with FIG. 2, there is shown a detailed view of an anterior end 207 of UUV 200. In an exemplary embodiment, each of inlets 245 coupled to corresponding inlet ducts 310 at opening or mouth 345. Inlet ducts 310 convey the fluid, for example, seawater, that enters UUV 200 via inlets 245 when UUV 200 is placed or submerged into the fluid. It will be understood that the terms fluid and seawater may be used interchangeably in the description herein. It will further be understood that the use of the term seawater is not intended to limit the meaning of the term fluid to seawater only, but can encompass any fluid in which UUV 200 may be submerged (for example, waters of deep lakes or other large body of water having the requisite thermoclines).

In an exemplary embodiment, each duct 310 may take the form of an extruded aluminum duct, tube, pipe or conduit. Other suitable metals and materials which are good thermal conductors and with required structural rigidity may also be used to fabricate duct 310. In an exemplary embodiment, duct 310 has a length of about three (3) feet, a diameter of about five (5) inches and a wall thickness of about 0.25 inches. It will, of course, be understood that the dimensions of duct 310 may be adjusted depending on the requirements of a given application. In one exemplary non-limiting configuration, a diameter of duct 310 may be approximately calculated as about one-sixth the length of the duct 310 and a wall thickness may be approximately calculated as about five (5) % of the diameter. One skilled in the art will appreciate that other relationships may be used depending on the requirements of a given application. Fins 320 are disposed on each duct 310. In one configuration, fins 320 take the form of a series of discs extending radially from ducts 310. In an exemplary embodiment, the fins are uniformly separated from one another. Fins 320 may have a diameter of about one (1) inch and a thickness of about 0.05 inch, by way of non-limiting example only. It will be understood that fins 320 may have different shapes and dimensions depending on the requirements of a given application. One or more ducts 310 form a heat exchanger arrangement that passes through bladder 330 (see FIG. 3B) disposed within housing 205 (see FIG. 2).

Figure 3B:
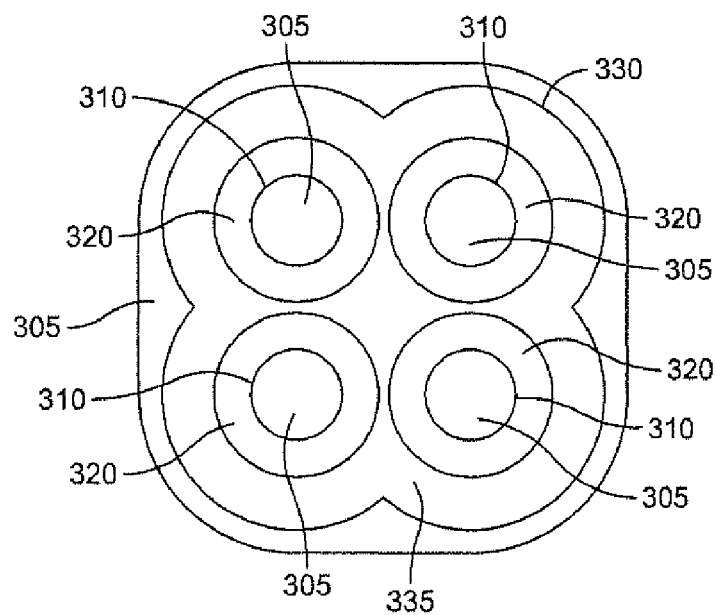
FIG. 3B is a cross-sectional view of the seawater intake ducts of FIG. 3A, according to an embodiment of the invention.

More particularly, with reference to FIG. 3B, ducts 310 pass through bladder 330 adapted to contain a clathrate. In other embodiments, ducts 310 may be thermally coupled to bladder 330 so as to effect thermal energy transfer between ducts 310 and bladder 330. For example, bladder 330 may be surrounded by one or more ducts 310. One or more ballasts (not shown) may be coupled to bladder 330. Such ballasts may be coupled to corresponding one or more openings (not shown) in housing 205 (see FIG. 2). The ballasts are adapted to receive, store and expel fluid 305 in which UUV (see FIG. 2) is submerged into. In one exemplary configuration, the clathrate may take the form of a solution of one part a hydrocarbon (such as propane, methane and butane, by way of non-limiting examples only) and six parts water. It will be understood that other compounds exhibiting similar temperature dependent expansion and contraction characteristics may also be used as the clathrate. Fins 320 increase the contact area between the clathrate contained within bladder 330 and ducts 310 extending through bladder 330. Heat exchanger ducts 310 are preferably arranged longitudinally with the bladder so as to convey fluid from inlets 245 to an outlet 420 (see FIG. 4) at posterior end 209 (see FIG. 2) of UUV 200 (see FIG. 2). The clathrate contained in bladder 330 surrounds ducts 310. When the temperature of the fluid flowing through ducts 310 of the heat exchanger arrangement is higher than the temperature of the clathrate contained in bladder 330, heat is transferred from the fluid to the clathrate. If, on the other hand, the temperature of the fluid flowing through ducts 310 is lower than the temperature of the clathrate, then heat is transferred from the clathrate to the fluid. The rate of heat transfer between the fluid and the clathrate depends on, inter alia, the difference in their respective temperatures.

Referring still to FIG. 3B, there is illustrated a schematic cross-sectional view of the heat exchanger arrangement. Reference numeral 305 points to the fluid (e.g., seawater) entering UUV 200 via inlets 245 (see FIG. 2) and conveyed via ducts 310. Bladder 330, ducts 310, and fins 320 are schematically represented using the same reference numerals as indicated in FIG. 3A. Bladder 330 is filled with clathrate 335. In the exemplary configuration of FIG. 3B, ducts 310 are arranged in a four-leaf clover-type arrangement. More particularly, ducts 310 are configured in a uniform, symmetrical pattern about a central longitudinal axis. In one configuration, the central longitudinal axis may coincide with a central longitudinal axis of housing 205. In another configuration, the central longitudinal axis may coincide with a central longitudinal axis of bladder 330. However, different arrangements or geometric patterns, varying numbers of ducts, and the like are contemplated to be within the scope of the present invention.

Further, in the illustrated embodiment, each duct 310 has a generally equal diameter. In other embodiments, one or more of ducts 310 may have different diameters. Ducts 310 are adapted to mitigate leakage of clathrate from bladder 330 into ducts 310 and thus maintain a constant clathrate mass within bladder 330. The size of bladder 330 and the mass (or amount) of clathrate contained therein may be adjusted depending on the size of UUV 200. The larger the UUV 200, the larger the size of bladder 330 and the greater the mass of clathrate contained therein.

In an exemplary configuration, all ducts 310 have uniform dimensions in terms of their lengths, diameters and thicknesses. In other configurations, ducts 310 may have different dimensions (e.g., different diameters) to vary the amount of fluid flowing therethrough. The amount of heat transfer between clathrate 335 in bladder 330 and fluid 305 flowing through ducts 310 is a function of, inter alia, the amount of fluid 305 flowing through ducts 310. The amount of heat transfer between clathrate 335 and fluid 305 may be regulated by adjusting the total amount of fluid 305 flowing through ducts 310. The total amount of fluid 305 flowing through ducts 310 may be varied by controlling the amount of fluid 305 entering inlets 245. One or more of ducts 310 may be completely or partially closed to reduce the total amount of fluid 305 flowing through the heat exchanger arrangement. Each of ducts 310 may be completely or partially closed using the valves or other such flow control mechanisms at inlets 245 of housing 205. Multiple ducts 310, thus, constitute multiple flow surfaces across which heat may transferred between clathrate 305 and fluid 305. In an exemplary embodiment, ducts 310 may have polished or smooth inner surfaces to maintain a fixed boundary layer along the inner surfaces and a constant laminar flow of fluid 305 through ducts 310. As is known the art, fixed boundary layers and laminar flow result in minimal drag forces.

Figure 4:
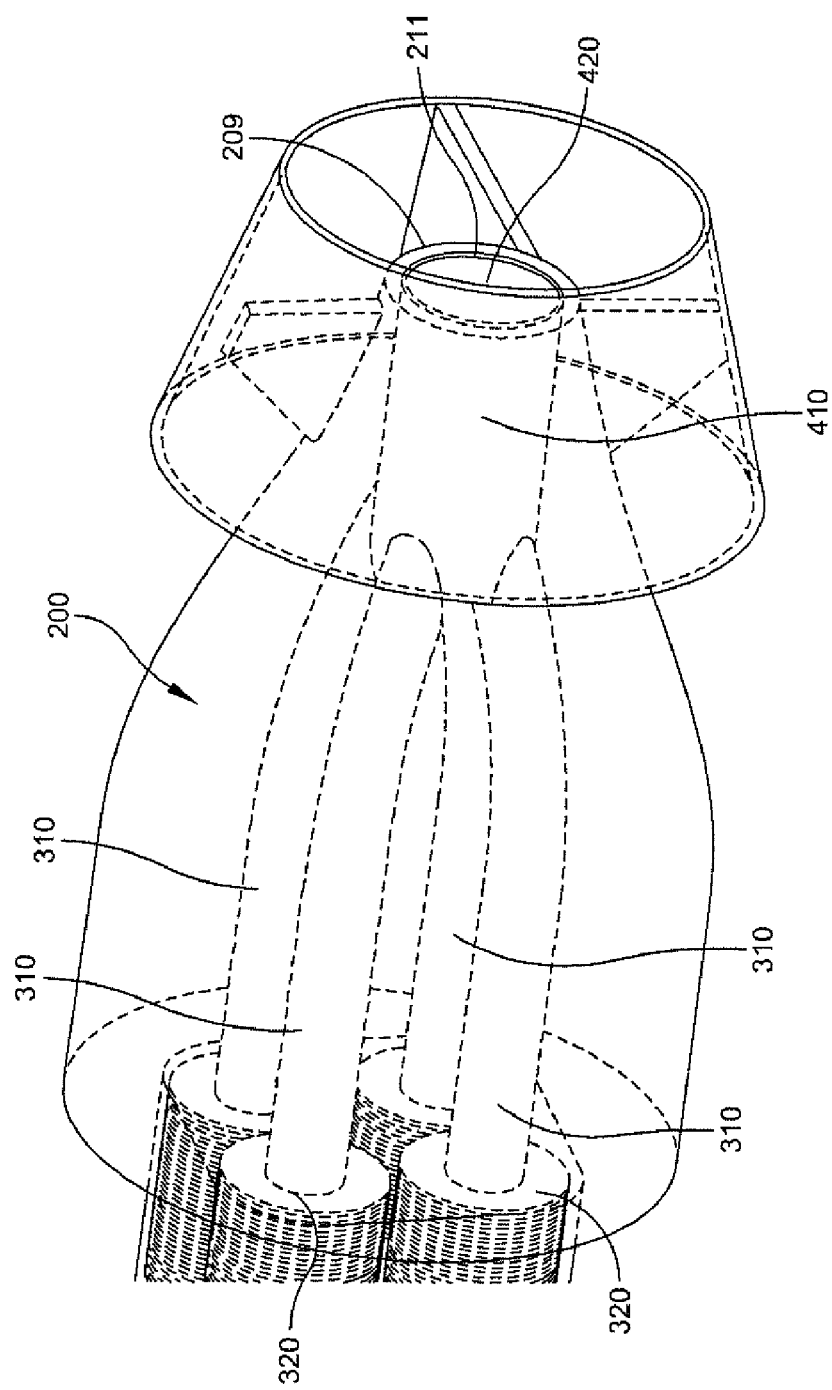
FIG. 4 illustrates a partial perspective view of the seawater outlet duct for the unmanned underwater vehicle of FIG. 2, according to an embodiment of the invention.

Referring now to FIG. 4, there is shown a partial perspective view of posterior end 209 of housing 205. In the illustrated embodiment, ducts 310a, 310b, 310c, and 310d merge to form a single outlet section 410. The diameter of outlet section 410 is sufficiently large to receive the fluid flowing through all of ducts 310a, 310b, 310c, and 310d. In an exemplary embodiment, outlet section 410 may be about four (4) inches long and have a diameter of about two (2) inches. It will be understood that outlet section 410 may have different dimensions depending the requirements of a given application. In one configuration, outlet section 410 may be fabricated from the same material as that of ducts 310, for example, aluminum. In another configuration, outlet section 410 may be fabricated from any other material which has sufficient structural rigidity and physical and chemical compatibility with the material used for ducts 310. Outlet section 410 has an opening or a mouth 420 which is coupled to outlet 211 in housing 205 at posterior end 209 of UUV 200. In another embodiment, outlet section 410 may be omitted. Instead, each of ducts 310a, 310b, 310c, and 310d may be coupled to corresponding outlet openings in housing 205 to expel fluid 305 conveyed by ducts 310a, 310b, 310c, and 310d.

Referring now to FIGS. 5A and 5B, there is illustrated a heat exchanger arrangement 530 disposed proximal to anterior end 207 of housing 205, according to an embodiment of the invention. The bladder (not shown) containing a clathrate is disposed along anterior end 207 of housing 205. Heat exchanger arrangement 530 is positioned within the bladder. Fins 320 are disposed on and extend radially from ducts 310. As described above, the rate of heat transfer between the clathrate contained in bladder 330 and the fluid, for example, seawater, flowing through ducts 310, depends on the difference between their respective temperatures. When the fluid enters intake ducts 310, the difference in the temperatures of the fluid and the clathrate is the greatest, resulting in a high rate of heat transfer between the fluid and the clathrate through the heat exchanger arrangement. As the fluid flows further along ducts 310, the difference in the temperatures of the fluid and the clathrate gradually decreases as a result of the transfer of heat between the fluid and the clathrate. Therefore, for a given mass of clathrate contained in bladder 330, a given volumetric flow rate of the fluid through ducts 310, and a given temperature difference between the temperatures of the fluid and the clathrate, a length of ducts 310 may be derived beyond which the temperature difference is not sufficient to cause any significant heat transfer between the clathrate and the fluid. The heat exchanger arrangement may, therefore, be disposed only along this calculated length for a given set of parameters described above.

In one configuration, heat exchanger arrangement 530 may extend substantially along the entire length of housing 205. In another configuration, for example, depending on the size of bladder 330 (and, mass of the clathrate contained therein) and the length of housing 205, heat exchanger arrangement 530 may extend only partially along the length of housing 205. Once the fluid passes through a given initial section of ducts 310 from inlets 245, the difference in the temperatures of the fluid and the clathrate may be so small that the heat transfer between the fluid and the clathrate may be minimal. The heat exchanging mechanism beyond this initial section of ducts 310 may therefore be practically ineffective and thus almost redundant. Heat exchanger arrangement 530 may, therefore, be arranged only along this initial section of ducts 310 extending from inlets 245. In one configuration, heat exchanger arrangement 530 may be configured to be approximately 10% to 15% of the total length of ducts 310. In an exemplary embodiment, heat exchanger arrangement 530 may be arranged proximal to anterior end 207 of housing 205.

Referring still to FIGS. 5A and 5B, in the illustrated embodiment, each pair (labeled 310a, 310b and 310c, 310d) of ducts 310 merges to form a single duct 510a, and 510b respectively. Ducts 510a, 510b may each be sized so to as receive the fluid flowing through the corresponding pair (310a, 310b and 310c, 310d) of ducts 310. The sizes of ducts 510a, 510b thus depend on the sizes of ducts 310a, 310b, 310c, and 310d. In one configuration, all ducts 310a, 310b, 310c, and 310d may be of uniform size, in which case, ducts 510a and 510b may also be of uniform size. It will be understood that each of ducts 310a, 310b, 310c, 310d may be sized differently and the size of ducts 510a, 510b be varied accordingly. Two single ducts 510a, 510b, in turn, merge to form a combined duct 520. Duct 520 extends longitudinally along housing 205 to posterior end 209. In another configuration, each duct 510a, 510b may individually extend longitudinally in housing 205 to posterior end 209 and duct 520 may be omitted. Depending on the requirements of a given application, the positions of ducts 510, 520 relative to housing 205 may be adjusted. For example, in the illustrated embodiment, duct 520 extends proximal to an inner wall 550 of housing 205. In another embodiment, duct 520 may extend coaxially along a central axis of housing 205. In yet another embodiment, ducts 510a, 510b and/or 520 may be omitted as ducts 310 extend substantially entirely through housing 205 to posterior end 209.

The operation of UUV 200 will now be described with reference to FIG. 6, according to an embodiment of the invention. At step 610, UUV 200 is initially placed in the water, for example, seawater. The valves to inlets 245 (see FIG. 2) are opened to allow the seawater to flow into inlets 245 (see FIG. 2) and therefrom to ducts 310 (see FIG. 3A), at step 620. It will be understood that the valves to inlets 245 may be utilized to control the mass of seawater flowing through inlets 245 and ducts 310.

Initially when UUV 200 is submerged in the water for the first time, clathrate 605 contained within bladder 120 may be at room temperature, at step 610. However, after UUV 200 has completed at least one dive cycle as illustrated in FIG. 6, clathrate 605 may be in a frozen or solid form or in a slurry form, at step 610. In either case, the surface water temperature is generally higher than the temperature of clathrate 605 in bladder 120 (see FIG. 1). As the relatively warm seawater flows through the ducts 310, heat energy from the relatively warm water is transferred through heat exchanger arrangement 530 (see FIGS. 5A, 5B) to clathrate 605 contained within bladder 120 (see FIG. 1). Such transfer of heat energy to clathrate 605 causes an increase in the temperature of clathrate 605 which, in turn, increases the density of clathrate 605 within bladder 120 (see FIG. 1), as clathrate 605 heats up and/or melts. The rate of heat transfer may be regulated by controlling the mass of seawater, at a given temperature differential, flowing through ducts 310. For a given mass of clathrate 605, as the density of clathrate 605 contained in bladder 120 (see FIG. 1) increases, the volume of clathrate 605 therein decreases. Such a decrease in the volume of clathrate 605 permits the expansion or an increase in the free volume of ballast 115 (see FIG. 1) available for storage of the seawater. In one configuration, seawater from the flowing through ducts 310 may be supplied to ballast 115. In another configuration, seawater may be supplied directly to ballast 115 through openings (not shown) in housing 205 (see FIG. 2). Likewise, in one configuration, seawater expelled from ballast 115 may be conveyed to outlet 410 (see FIG. 4) via one or more ducts 310. In another configuration, seawater may be expelled from ballast 115 directly in the sea. As the amount of the seawater stored in ballast 115 increases, the buoyancy of UUV 200 decreases and UUV 200 starts its dive into the water, at 630.

In a start dive state at step 630, valves at inlets 245 (see FIG. 2A) are gradually closed. At this point, ballast 115 is substantially full of seawater, and control fins 150 are actuated to commence the dive of UUV 200. It will be appreciated that the closure of inlets 245 (see FIG. 2) does not significantly alter the drag forces experienced by UUV 200. During the descent stage at step 640, the valves to inlets 145 remain closed; the clathrate remains generally melted and ballast 115 remains substantially full of seawater.

In an end dive stage at step 650, the valves to inlets 145 are opened, ballast 115 is substantially full of seawater, and clathrate 605 which is in generally liquid form begins cooling as the cold seawater flows through ducts 310 (see FIG. 3). The temperature of the water is generally lower than the freezing/melting temperature of clathrate 605. The heat energy from clathrate 605 is transferred through heat exchanger arrangement 530 (see FIGS. 5A and 5B) to the relatively colder seawater flowing through ducts 310. Such transfer of heat from generally liquid clathrate 605 initiates the freezing of clathrate 605 which is accompanied by a decrease in the density of clathrate 605. For a given mass of clathrate 605 contained within bladder 330, as clathrate 605 freezes, the decrease in the density results in an increase in the volume of clathrate 605 and bladder 120. The increase in volume of bladder 120 decreases the free volume of ballast 115 available for storage of the seawater and causes ballast 115 to start expelling seawater contained in ballast 115. As the seawater is being expelled from ballast 115, the buoyancy of UUV 200 gradually increases. UUV 200 thus begins a climb state, at step 660.

In a start climb state, at step 660, valves to inlets 145 are gradually closed. As clathrate 605 substantially freezes, the seawater is gradually removed from ballast 115. Control fins 150 are actuated to guide the climb of UUV 200. During the ascent state, at steps 670, 680, the valves to inlets 145 remain closed, clathrate 605 is generally in a solid state and ballast 115 is substantially empty.

In an end climb state, at step 610, the valves to inlets 145 are gradually opened. The relatively warm surface water starts flowing through ducts 310, clathrate 605 begins to melt, seawater begins to fill into ballast 115 and the steps described herein are repeated. It will be understood that a desired clathrate temperature may be maintained by appropriately regulating the flow of the seawater, at a given temperature, through ducts 310 via the valves at inlets 245. Similarly, the heat transfer rate to melt or freeze the clathrate may be controlled by regulating the flow of the seawater, at a given temperature, through ducts via the valves at inlets 245.

Figure 7:
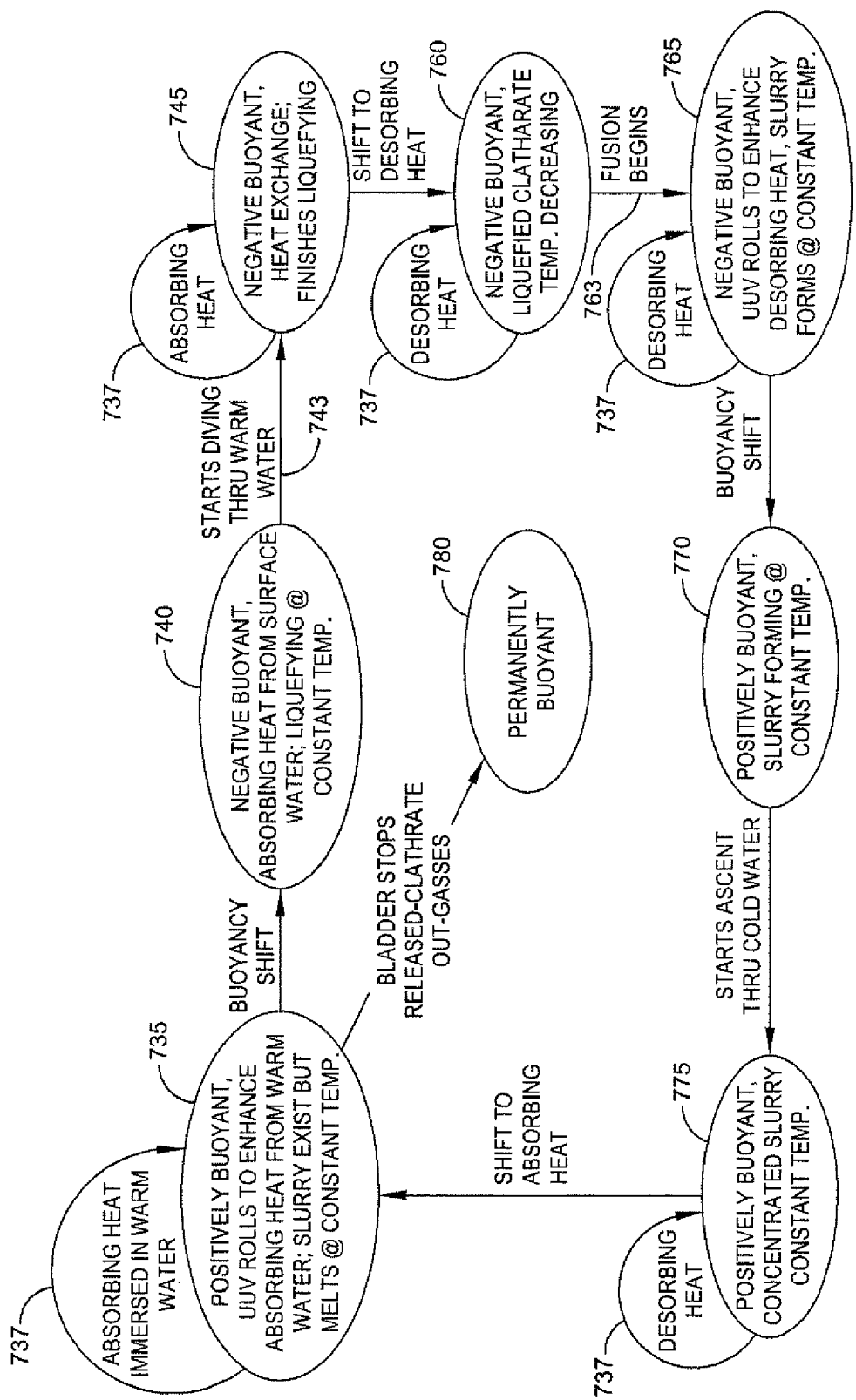
FIG. 7 is a schematic diagram of a thermodynamic cycle for the unmanned underwater vehicle of FIG. 2, according to an embodiment of the invention.

FIG. 7 illustrates the thermodynamic cycle for UUV 200 in further detail. Arrows 737 indicate that UUV 200 can remain in that state for a period of time. At 735, UUV 200 is along the surface of the water body. UUV is positively buoyant and can roll to enhance absorbing heat from the relatively warm water. A clathrate slurry exists, but it begins to melt at the constant temperature of the clathrate fusion. At 740, UUV 200 becomes negatively buoyant with the clathrate still absorbing heat from the surface water and the clathrate slurry still liquefying. UUV 200 begins diving through the warm water at 743, remaining negatively buoyant at 745. The clathrate finishes liquefying. Eventually, there is a thermodynamic shift for the liquefied clathrate from absorbing heat to desorbing heat. The thermodynamic shift occurs as the UUV travels deeper into the water body, where the water temperature is relatively lower than the freezing temperature of the clathrate. At 760, UUV 200 remains negatively buoyant, and the temperature of the liquefied clathrate starts to decrease. Fusion of the clathrate begins at 763, UUV 200 is negatively buoyant at 765, and a clathrate slurry begins to form at the constant temperature. At 770, UUV 200 transitions to being positively buoyant again, and is increasingly positively buoyant at 775. It is noted that 740 and 770 are primarily transition states. Additionally, 780 indicates that the cycle may be broken if the clathrate gases out of solution.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term invention merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. An apparatus comprising:
   a housing;
   a ballast disposed within said housing, said ballast adapted to receive, store and expel a fluid;
   a bladder operatively coupled to said ballast, wherein an increase in the volume of said bladder causes a decrease in a volume of the ballast available for storage of the fluid therewithin and a decrease in the volume of said bladder causes an increase in the volume of the ballast available for the storage of the fluid therewithin; and
   a heat exchanger having one or more heat exchanger ducts thermally coupled to the bladder, said one or more heat exchanger ducts adapted to receive the fluid from outside the housing;
   wherein the bladder is configured to receive a clathrate.

2. The apparatus of claim 1, further comprising fins disposed on an outer surface of said one or more heat exchanger ducts.

3. The apparatus of claim 2, wherein the fins extend radially from the outer surface.

4. The apparatus of claim 2, wherein the one or more heat exchanger ducts is a plurality of heat exchanger ducts passing through the bladder, each of said plurality of heat exchanger ducts separated from one another along their respective lengths and operative to convey the fluid from outside the housing there through.

5. The apparatus of claim 4, wherein the plurality of heat exchanger ducts are configured in a uniform, symmetrical pattern about a central longitudinal axis of the bladder.

6. The apparatus of claim 4, wherein the plurality of heat exchanger ducts are configured in a uniform, symmetrical pattern about a central longitudinal axis of the housing.

7. The apparatus of claim 1, wherein the housing has a first inlet for receiving the fluid in which the apparatus is submerged, and a first outlet; and wherein the ballast is configured to receive and store the fluid via said first inlet, and to expel the fluid via the first outlet.

8. The apparatus of claim 7, wherein the one or more heat exchanger ducts is coupled to said first inlet and passes through said bladder and receives the fluid through said first inlet to cause an increase or a decrease in the volume of said bladder depending on the difference in the temperatures of the fluid and a clathrate received in said bladder.

9. The apparatus of claim 8, wherein the density of a clathrate received in said bladder decreases and the volume of the clathrate received in said bladder increases when the clathrate received in said bladder is cooled to or below its freezing point by the fluid passing through the heat exchanger, thereby increasing the volume of the bladder, and
   wherein the density of the clathrate received in said bladder increases and the volume of the clathrate received in said bladder decreases when the clathrate received in said bladder is heated above its freezing point by the fluid passing through the heat exchanger, thereby decreasing the volume of the bladder.

10. The apparatus of claim 1, wherein said housing further comprises a flexible membrane separating said ballast from said bladder, such that an increase in the volume of said bladder decreases the volume of the ballast available for storage of the fluid and a decrease in the volume of said bladder increases the volume of the ballast available for storage of the fluid.

11. The apparatus of claim 3, wherein said plurality of fins are disposed on about 15% of the length of said one or more heat exchanger ducts.

12. The apparatus of claim 1, wherein the apparatus is an unmanned underwater vehicle.

13. A method for altering the buoyancy of an underwater vehicle comprising the steps of:
    submerging the underwater vehicle into a body of water, said underwater vehicle comprising:
       a housing;
       a ballast disposed in said housing, said ballast adapted to receive from, store therewithin and expel the water to the body of water;
       a bladder containing a clathrate, said bladder disposed in an operative coupling with said ballast such that an increase in the volume of said bladder causes a decrease in the volume of said ballast available for the storage of water therewithin and a decrease in the volume of said bladder causes an increase in the volume of said ballast available for the storage of water therewithin; and
       a heat exchanger duct thermally coupled to said bladder,
    in a first operational stage, allowing the water to flow through said heat exchanger duct, wherein the temperature of the water is higher than a first temperature of the clathrate, thereby allowing the water to flow to and be stored within the ballast, thereby decreasing the buoyancy of the underwater vehicle; and
    in a second operational stage, allowing the water to flow through said heat exchanger duct, wherein the temperature of the water is lower than a freezing temperature of the clathrate, thereby causing the water to flow out of the ballast, thereby increasing the buoyancy of the underwater vehicle.

14. The method of claim 13, wherein said heat exchanger duct further comprises a plurality of fins disposed thereon.

15. The method of claim 14, wherein said plurality of fins extends radially from the heat exchanger duct.

16. The method of claim 13, wherein said plurality of fins is disposed on about 15% of the length of said heat exchanger duct.

17. The method of claim 13, wherein said clathrate comprises about one part hydrocabon and about six parts water.

18. A heat exchanger for an underwater vehicle, said heat exchanger comprising:
    a first heat exchanger duct having an inlet and an outlet, said duct disposed in a bladder, said bladder configured to receive a clathrate;
    wherein said first heat exchanger duct is at least partially surrounded by a clathrate received in said bladder and is adapted to receive a fluid through said inlet,
    wherein, heat is transferred between the clathrate received in said bladder and the fluid flowing through said duct depending on the temperatures of the fluid and the clathrate received in said bladder, and
    wherein, said heat transfer between the clathrate received in said bladder and the fluid causes an increase or a decrease in the volume of said bladder.

19. The heat exchanger of claim 18, further comprising a plurality of fins disposed on said heat exchanger duct.

20. The heat exchanger of claim 19, wherein said plurality of fins comprises a plurality of discs.

21. The heat exchanger of claim 18, further comprising second, third, and fourth heat exchanger ducts each having an inlet and an outlet, wherein said first, second, third, and fourth heat exchanger ducts configured in a uniform, symmetrical pattern about a central longitudinal axis of the housing.

* * * * *